(12) United States Patent
Adler et al.

(10) Patent No.: US 10,140,873 B2
(45) Date of Patent: Nov. 27, 2018

(54) PERFORMANCE-BASED TRACK VARIATION FOR AIRCRAFT FLIGHT MANAGEMENT

(71) Applicant: The Boeing Company, Chicago, IL (US)

(72) Inventors: Charles Otis Adler, Bellevue, WA (US); Sheila Ruth Conway, Seattle, WA (US); Douglas A. Stoll, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 28 days.

(21) Appl. No.: 15/238,693

(22) Filed: Aug. 16, 2016

(65) Prior Publication Data

US 2018/0053425 A1 Feb. 22, 2018

(51) Int. Cl.
*G08G 5/00* (2006.01)
*G01C 21/20* (2006.01)
*G08G 5/02* (2006.01)

(52) U.S. Cl.
CPC ........... *G08G 5/0039* (2013.01); *G01C 21/20* (2013.01); *G08G 5/0013* (2013.01);
(Continued)

(58) Field of Classification Search
None
See application file for complete search history.

(56) References Cited

U.S. PATENT DOCUMENTS 8,185,258 B2 5/2012 Dey et al.
8,731,810 B2 5/2014 Conway
(Continued)

FOREIGN PATENT DOCUMENTS

EP 1 818 891 8/2007
EP 2 287 822 2/2011
(Continued)

OTHER PUBLICATIONS

"Method and Device for Supplying Data Relating to a Flight Plan on a Human-Machine Interface", Jul. 10, 2014, Computer Weekly News (Year: 2014).*

(Continued)

*Primary Examiner* — Tamara L Weber
(74) *Attorney, Agent, or Firm* — McDonnell Boehnen Hulbert & Berghoff LLP

(57) ABSTRACT

An example method for modifying a flight path of an aircraft includes receiving real time positioning estimates for an aircraft, receiving an actual navigation performance (ANP) of the aircraft informative of uncertainty in the position estimate, receiving a required navigation performance (RNP) instrument flight procedure for the aircraft, receiving spacing input from an air traffic controller that indicates spacing requirements between the aircraft and one or more other aircraft, receiving information relating to communities underneath the flight path, calculating, by a system onboard the aircraft, a modification to the flight path to be flown by the aircraft that causes the aircraft to remain within the containment boundaries of the RNP instrument flight procedure while reducing noise impact to the communities underneath the flight path and meeting the spacing requirements of the air traffic controller, and displaying a visual representation of a modified flight path for the aircraft.

20 Claims, 6 Drawing Sheets

(52) U.S. Cl.
CPC ......... *G08G 5/0021* (2013.01); *G08G 5/0047* (2013.01); *G08G 5/025* (2013.01)

(56) References Cited

U.S. PATENT DOCUMENTS

| | | | |
|---|---|---|---|
| 9,098,997 B2* | 8/2015 | Stewart | G08G 5/003 |
| 9,224,302 B1* | 12/2015 | Young | G08G 5/0039 |
| 2003/0004619 A1* | 1/2003 | Carriker | G01C 23/00 |
| | | | 701/3 |
| 2004/0189492 A1* | 9/2004 | Selk, II | G01C 23/00 |
| | | | 340/973 |
| 2005/0098681 A1 | 4/2005 | Berson et al. | |
| 2006/0191326 A1 | 8/2006 | Smith et al. | |
| 2008/0036659 A1* | 2/2008 | Smith | G01S 13/765 |
| | | | 342/454 |
| 2009/0112464 A1 | 4/2009 | Belcher | |
| 2009/0140925 A1* | 6/2009 | Smith | G01H 17/00 |
| | | | 342/454 |
| 2010/0217510 A1 | 8/2010 | Deker | |
| 2013/0226373 A1* | 8/2013 | Bollapragada | G08G 5/0039 |
| | | | 701/3 |
| 2016/0012734 A1 | 1/2016 | Bruce et al. | |
| 2016/0093223 A1* | 3/2016 | Caudron | B64D 45/00 |
| | | | 701/3 |
| 2017/0236429 A1* | 8/2017 | Stark | G08G 5/0047 |
| | | | 701/14 |
| 2018/0012503 A1* | 1/2018 | Roger | G08G 5/0047 |

FOREIGN PATENT DOCUMENTS

| | | |
|---|---|---|
| EP | 2 620 932 | 7/2013 |
| EP | 2 717 018 | 4/2014 |
| WO | WO 2012/078231 | 6/2012 |
| WO | WO-2014024382 A1 * | 2/2014 ............... G01H 3/00 |

OTHER PUBLICATIONS

Jinhua et al. "AIRNOISE: A Tool for Preliminary Noise-Abatement Terminal Approach Route Design", 16th ATAA Aviation Technology, Integration and Operations Conference, Jun. 13-17, 2016, Washington D.C.

European Search Report prepared by the European Patent Office in Application No. EP 17 17 1895, dated Dec. 20, 2017.

* cited by examiner

DETERMINING THE FLIGHT MARGIN AT DIFFERENT POINTS ALONG THE FLIGHT PATH DUE TO CHANGING VALUES OF THE RNP ALONG THE FLIGHT PATH AND CHANGING VALUES OF THE ANP DURING FLIGHT ~266

FIG. 7

DETERMINING THE MODIFIED FLIGHT PATH FOR THE AIRCRAFT SO AS TO STEER THE AIRCRAFT, IN APPROXIMATELY REAL TIME, IN RESPONSE TO THE INFORMATION ~268

FIG. 8

DISPLAYING A VISUAL REPRESENTATION OF FLIGHT PATHS TAKEN BY A PLURALITY OF AIRCRAFT, VARIATION MARGINS THAT CAN BE ACHIEVED WITHIN RNPs FOR THE PLURALITY OF AIRCRAFT, AND A NOISE EXPOSURE MAP FOR THE COMMUNITIES UNDERNEATH THE RNPs ~270

FIG. 9

DISPLAYING A VISUAL REPRESENTATION OF THE CONTAINMENT BOUNDARIES OF THE RNP INSTRUMENT FLIGHT PROCEDURE ~272

FIG. 10

CAUSING THE AIRCRAFT TO FLY THE MODIFIED FLIGHT PATH ~274

FIG. 11

PERFORMANCE-BASED TRACK VARIATION FOR AIRCRAFT FLIGHT MANAGEMENT

FIELD

The present disclosure relates generally to methods for modifying a flight path of an aircraft, and more particularly to calculating, by a system onboard the aircraft, a modification to the flight path to be flown by the aircraft that causes the aircraft to remain within containment boundaries of a Required Navigation Performance (RNP) instrument flight procedure while reducing noise impact to the communities underneath the flight path and meeting the spacing requirements of the air traffic controller.

BACKGROUND

Performance-Based Navigation (PBN), including the widely used Required Navigation Performance (RNP) and Area Navigation (RNAV) instrument procedures, are key parts of airspace modernization worldwide. For example, RNAV and RNP-based procedure deployment is a component of the United States' airspace modernization, the Federal Aviation Administration (FAA) NextGen program, that is implementing new PBN routes and procedures to leverage emerging technologies and aircraft navigation capabilities. Modern commercial aircraft fly PBN flight paths with very high precision. The aircraft can exploit high accuracy provided by global positioning system (GPS)-based navigation systems, modern Flight Management Systems (FMSs) and Flight Control Systems (FCSs). Due to this highly accurate path-keeping capability, the use of PBN removes much of the variability traditionally seen in aircraft flight paths, and results in highly repeatable operations.

The benefits of using RNAV and RNP procedures thus include improved aircraft stability on approach, improved aircraft predictability for air traffic control, reduced fuel burn, lower track miles, improved airport capacity, reduced (concentrated) noise footprints, and paths tailored to avoid noise sensitive areas. However, these same procedures can be detrimental for the exact reason that modern commercial aircraft fly RNAV and RNP defined flight paths with very high precision.

While accuracy and repeatability can be desirable, there are a number of operational and safety issues that could benefit from judicious variation in flight paths. For example, in approach operations, a concentrated noise footprint stemming from repeatable operations creates noise issues for communities under the flight paths. In addition, fixed, consistent flight paths mean that air traffic controllers (ATC) lose some ability to fine-tune aircraft longitudinal spacing that the ATC once exercised by vectoring traffic. Furthermore, highly repeatable path-keeping traffic means a higher risk of loss of separation between aircraft if the concentrated portions of the traffic streams conflict.

Existing solutions related to path variation with use of RNP are limited to offsetting flight paths relative to the originally-defined procedure. For example, ATC may pull some traffic off of fixed routes to avoid or organize traffic using vectors. However, this negates efficiency and other benefits of fixed track use, and limits the ability of on-board aircraft systems to provide alerts supporting high integrity guidance and navigation. Further solutions provide for aircraft to fly an offset path, in which both the offset path and associated boundaries are shifted by an amount of the offset. However, this method is not usable in constrained airspace associated with arrival, approach and departure routes in a vicinity of airports where locations of original boundaries may be integral to safe operations.

What is needed is a method that enables use of full margins of an RNP procedure based on measured performance to retain efficiency while also addressing noise concerns and manage spacing/timing of aircraft.

SUMMARY

In one example, a method for modifying a flight path of an aircraft is described. The method comprises receiving real time positioning information for an aircraft, and receiving an actual navigation performance (ANP) of the aircraft. The ANP indicates uncertainty in the real time positioning of the aircraft based on information collected from a navigation system onboard the aircraft. The method also comprises receiving a required navigation performance (RNP) instrument flight procedure for the aircraft, and the RNP instrument flight procedure indicates a fixed-route accuracy and containment boundaries required during flight for the aircraft to fly a path between two points along a flight path. The containment boundaries are defined by a flight path centerline with limits determined by associated margins. The method also comprises receiving spacing input from an air traffic controller that indicates spacing requirements between the aircraft and one or more other aircraft, and receiving information relating to communities underneath the flight path. The method also comprises calculating, by a system onboard the aircraft, a modification to the flight path to be flown by the aircraft that causes the aircraft to remain within the containment boundaries of the RNP instrument flight procedure while reducing noise impact to the communities underneath the flight path and meeting the spacing requirements of the air traffic controller, and displaying a visual representation of a modified flight path for the aircraft.

In another example, a system is described that comprises a communication interface for receiving real time positioning of an aircraft during flight, and an actual navigation performance (ANP) of the aircraft. The ANP indicates uncertainty in the real time positioning of the aircraft. The communication interface also for receiving information for a required navigation performance (RNP) instrument flight procedure for the aircraft, and the RNP instrument flight procedure indicates a fixed-route accuracy and containment boundaries required during flight for the aircraft to fly a path between two points along a flight path. The containment boundaries are defined by a flight path centerline with limits determined by associated margins. The system also includes data storage for storing spacing input from an air traffic controller that indicates spacing requirements between the aircraft and one or more other aircraft, and information relating to communities underneath the flight path. The system also includes one or more processors for executing instructions stored on the data storage to calculate a modification to the flight path to be flown by the aircraft that causes the aircraft to remain within the containment boundaries of the RNP instrument flight procedure while reducing noise impact to the communities underneath the flight path and meeting the spacing requirements of the air traffic controller, and an output interface for outputting a modified flight path for the aircraft.

In another example, a non-transitory computer readable storage medium is described having stored therein instructions, that when executed by a system having one or more processors, causes the system to perform functions. The functions comprise receiving real time positioning information of an aircraft, and receiving an actual navigation performance (ANP) of the aircraft. The ANP indicates uncertainty in the real time positioning of the aircraft based on information collected from a navigation system onboard the aircraft. The functions also comprise receiving a required navigation performance (RNP) instrument flight procedure, and the RNP indicates a fixed-route accuracy and containment boundaries required during flight for the aircraft to fly a path between two points along a flight path. The containment boundaries are defined by a flight path centerline with limits determined by associated margins. The functions also comprise receiving spacing input from an air traffic controller that indicates spacing requirements between the aircraft and one or more other aircraft, and receiving information relating to communities underneath the flight path. The functions also comprise calculating a modification to the flight path to be flown by the aircraft that causes the aircraft to remain within the containment boundaries of the RNP while reducing noise impact to the communities underneath the flight path and meeting the spacing requirements of the air traffic controller, and displaying a visual representation of a modified flight path for the aircraft.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 7 shows a flowchart of an example method for use with the method, according to an example embodiment.

FIG. 8 shows a flowchart of an example method for use with the method, according to an example embodiment.

FIG. 9 shows a flowchart of an example method for use with the method, according to an example embodiment.

FIG. 10 shows a flowchart of an example method for use with the method, according to an example embodiment.

FIG. 11 shows a flowchart of an example method for use with the method, according to an example embodiment.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Described below are example systems and methods to implement variation in flight paths that can assist with spreading a noise footprint stemming from repeatable operations as well as reducing concentrated traffic patterns.

An example method for modifying a flight path of an aircraft includes receiving real time positioning information for an aircraft, receiving a calculated actual navigation performance (ANP) of the aircraft, receiving a required navigation performance (RNP) instrument flight procedure for the aircraft, receiving spacing input from an air traffic controller that indicates spacing requirements between the aircraft and one or more other aircraft, receiving information relating to communities underneath the flight path, calculating, by a system onboard the aircraft, a modification to the flight path to be flown by the aircraft that causes the aircraft to remain within the containment boundaries of the RNP instrument flight procedure while reducing noise impact to the communities underneath the flight path and meeting the spacing requirements of the air traffic controller, and displaying a visual representation of a modified flight path for the aircraft.

Figure 1:
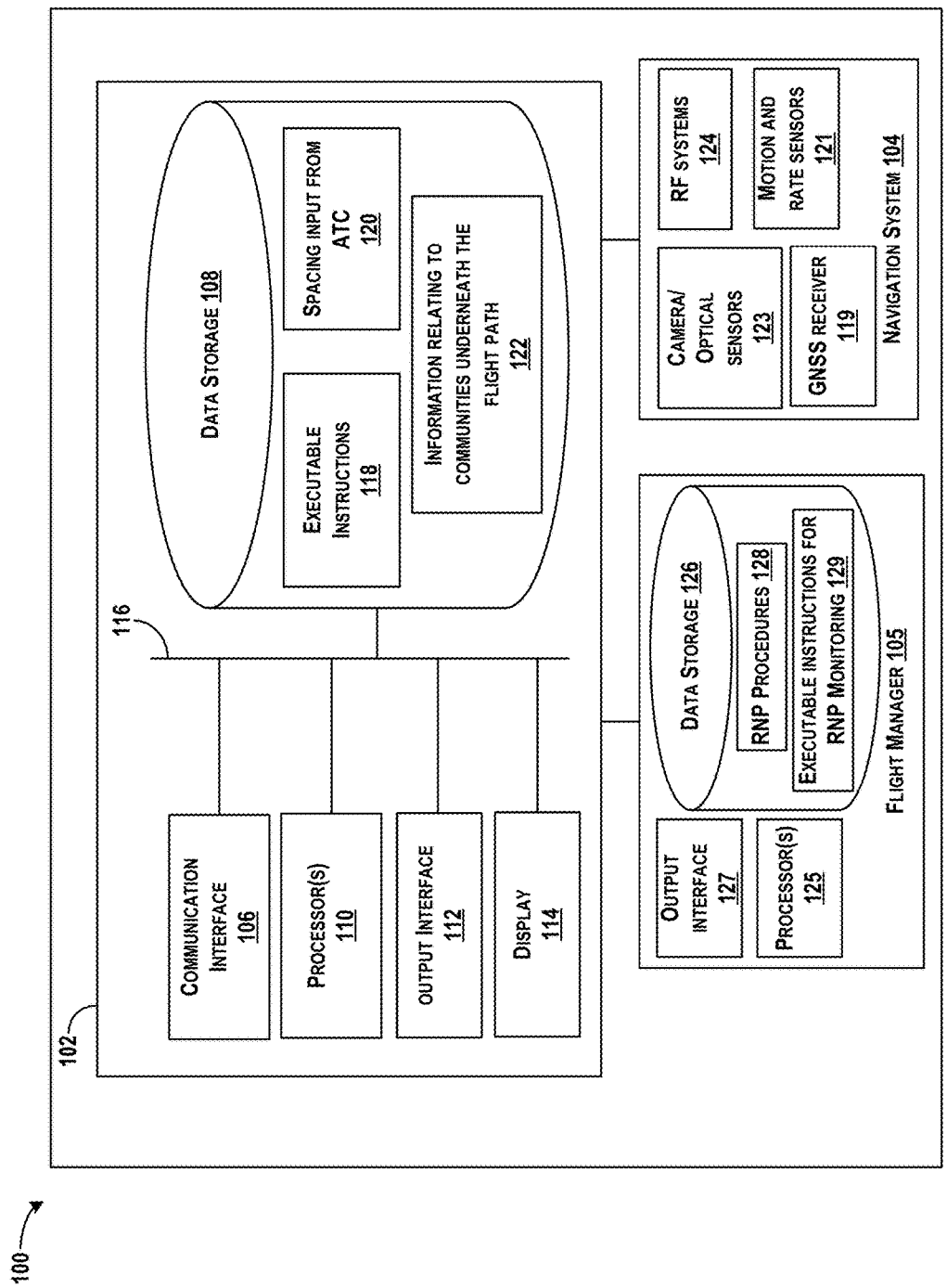
FIG. 1 is a block diagram of an aircraft, according to an example embodiment.

Referring now to FIG. 1, a block diagram of an aircraft 100 is illustrated, according to an example embodiment. The aircraft 100 includes a system 102 onboard the aircraft 100 that is in communication with a navigation system 104 and a flight manager 105 onboard the aircraft 100.

The system 102 includes a communication interface 106, data storage 108, one or more processor(s) 110, an output interface 112, and a display 114 each connected to a communication bus 116. The system 102 may also include hardware to enable communication within the system 102 and between the system 102 and other devices (not shown). The hardware may include transmitters, receivers, and antennas, for example.

The communication interface 106 may be a wireless interface and/or one or more wireline interfaces that allow for both short-range communication and long-range communication to one or more networks or to one or more remote devices. Such wireless interfaces may provide for communication under one or more wireless communication protocols, such as voice communication using Very High Frequency (VHF), VHF Data link (VDL), VDL Mode 2, Aircraft Communications Addressing and Reporting System (ACARS) digital communications over VHF radio and satellite communications (SATCOM), Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include aircraft data buses such as Aeronautical Radio, Incorporated (ARINC) 429, 629, or 664 based interfaces, Ethernet interface, a Universal Serial Bus (USB) interface, or similar interface to communicate via a wire, a twisted pair of wires, a coaxial cable, an optical link, a fiber-optic link, or other physical connection to a wireline network.

Thus, the communication interface 106 may be configured to receive input data from one or more devices, and may also be configured to send output data to other devices. In some examples, the communication interface 106 may also maintain and manage records of data received and sent by the system 102. The communication interface 106 may also include a receiver and transmitter to receive and send data. In other examples, the communication interface 106 may also include a user-interface, such as a keyboard, microphone, touchscreen, etc., to receive inputs as well.

In examples described below, the communication interface 106 receives real time positioning of the aircraft 100 during flight from the navigation system 104, and also receives an actual navigation performance (ANP) of the aircraft 100 as calculated or determined by real-time monitoring of uncertainty in received navigation signals from the navigation system 104. Thus, the ANP indicates a magnitude of potential uncertainty in the real time positioning of the aircraft 100 during flight. Furthermore, the communication interface 106 receives information for a required navigation performance (RNP) instrument flight procedure for the aircraft 100, from ground-based traffic controllers, or from the flight manager 105, that indicates a fixed-route accuracy and containment boundaries required during flight for the aircraft 100 to fly a path between two points along a flight path. The containment boundaries are defined by a flight path centerline with limits determined by associated margins.

The data storage 108 may include or take the form of one or more computer-readable storage media that can be read or accessed by the processor(s) 110. The computer-readable storage media can include volatile and/or non-volatile storage components, such as optical, magnetic, organic or other memory or disc storage, which can be integrated in whole or in part with the processor(s) 110. The data storage 108 is considered non-transitory computer readable media. In some embodiments, the data storage 108 can be implemented using a single physical device (e.g., one optical, magnetic, organic or other memory or disc storage unit), while in other embodiments, the data storage 108 can be implemented using two or more physical devices.

The data storage 108 thus is a non-transitory computer readable storage medium, and executable instructions 118 are stored thereon. The instructions 118 include computer executable code. When the instructions 118 are executed by the system 102 that has the one or more processor(s) 110, the system 102 is caused to perform functions. Such functions include calculating modifications to a flight path, and these functions are described more fully below.

The data storage 108 further stores spacing input 120 from an air traffic controller (ATC) that indicates spacing requirements between the aircraft 100 and one or more other aircraft, and information 122 relating to communities underneath the flight path. The spacing input 120 and the information 122 relating to communities underneath the flight path may be received at the communication interface 106 and then stored in the data storage 108.

The processor(s) 110 may be a general-purpose processor or a special purpose processor (e.g., digital signal processors, application specific integrated circuits, etc.). The processor(s) 110 may receive inputs from the communication interface 106, and process the inputs to generate outputs that are stored in the data storage 108 and output to the display 114. The processor(s) 110 can be configured to execute the executable instructions 118 (e.g., computer-readable program instructions) that are stored in the data storage 108 and are executable to provide the functionality of the system 102 described herein.

As one example, the processor(s) 110 execute the executable instructions 118 stored on the data storage 108 to calculate a modification to the flight path to be flown by the aircraft 100 that causes the aircraft 100 to remain within the containment boundaries of the RNP instrument flight procedure while reducing noise impact to the communities underneath the flight path and meeting the spacing requirements of the air traffic controller.

The processor(s) 110 can execute the executable instructions 118 stored in the data storage 108 to perform functions in real-time during flight of the aircraft 100. Such function can then occur with no or little delay to process additional data received from other sources or through manual input. The real time processing means that the processor(s) 110 perform the actions during flight of the aircraft 100. The real time processing may continually process information received from the communication interface 106. Put another way, the real time aspect includes the system 102 deciding to modify the flight path of the aircraft 100 substantially immediately upon receiving new or updated spacing requirements between the aircraft 100 and one or more other aircraft, and new or updated information 122 relating to communities underneath the flight path. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In one example, the information 122 relating to communities includes real time community noise inquiries received by the communication interface 106, and the processor(s) 110 further determine the modified flight path for the aircraft 100 so as to steer the aircraft 100, in approximately real time, in response to the information 122. Here, "approximately" indicates with little to no delay, or with no delay due to processing of additional data.

The output interface 112 outputs a modified flight path for the aircraft 100. The output interface 112 can output the modified flight path to the display 114 or to other aircraft or ground-based systems as well. Thus, the output interface 112 may be similar to the communication interface 106 and can be a wireless interface (e.g., transmitter) or a wired interface as well.

The navigation system 104 includes a Global Navigation Satellite System (GNSS) receiver 119 configured to provide data that is typical of well-known Global Positioning System (GPS) systems, such as the coordinates of the aircraft 100. Position estimates provided by the GNSS receiver 119 can be replaced or augmented to enhance accuracy and stability by inputs from other sensors, such motion and rate sensors 121, camera and optical sensors 123, and radio frequency (RF) systems 124. Such navigation data may be utilized by the system 102 for various functions, such as to navigate to a target position. The navigation system 104 may also include hardware to enable communication within the navigation system 104 and between the navigation system 104 and other devices (not shown). The hardware may include transmitters, receivers, and antennas, for example.

The navigation system 104 may also include other components such as a multi-mode receiver that uses other aviation-approved sources of navigation information. The RF systems 124 may include radar systems for ranging and target detection or Instrument Landing Systems (ILS) and various GNSS Augmentation Systems such as the Ground Based Augmentation System (GBAS). The camera and optical sensors 123 may include light detection and ranging (LIDAR) systems, laser detection and ranging (LADAR) systems, and/or an infrared or forward-looking infrared (FLIR) system, among other possibilities.

The camera and optical sensors 123 can also include an imaging system, such as a video camera, to capture image data from an environment. As a specific example, charge-coupled device (CCD) cameras or complementary metal-oxide-semiconductor (CMOS) cameras can be used, among other possibilities. Thus, the camera and optical sensors 123 can include a visual camera. The camera and optical sensors 123 can also include a night-vision camera and/or a forward looking infrared radar device or an infrared camera. The camera and optical sensors 123 may capture imagery of the environment and compare the imagery to what is expected given a current estimated position to help with navigation.

The flight manager 105 includes one or more processor(s) 125 that accesses data storage 126 to retrieve information for communication with the system 102 through an output interface 127. As one example, the flight manager 105 retrieves an RNP instrument flight procedure 128 for the aircraft 100 from the data storage 126 and provides the RNP instrument flight procedure 128 to the system 102 via the output interface 127. The RNP instrument flight procedure 128 indicates a fixed-route accuracy and containment boundaries required during flight for the aircraft 100 to fly a path between two points along a flight path. The processor(s) 125 may also execute instructions for RNP monitoring 129 stored within the data storage 126 to monitor a flight path of the aircraft 100.

The aircraft 100 can be operated using PBN-based flight path variation to intentionally add beneficial variability into aircraft track-keeping, while honoring any required performance constraints while executing area navigation operations. New functions described herein provide variation management and alternate flight paths constrained by required performance that are integrated with existing flight management system functions. The functions can enhance safety by de-concentrating air traffic, reduce environmental impact by spreading noise, and can also provide additional longitudinal aircraft spacing control in arrival and approach operations.

The PBN flight path variation exploits existing measurement of real-time position uncertainty determined in an actual navigation performance (ANP) to dynamically bound potential track variation to predefined limits. The system 102 will add variability to the tracking performance during RNAV and RNP procedures while remaining within the constraints of the defined required performance by using real-time ANP. These functions can be used as airplane stand-alone capabilities to improve noise distributions, meet timing or spacing goals and/or to enhance safety by implementing airline specific open-loop variation distributions or aircrew input variations to address known or expected issue areas. These capabilities can also be integrated with ground systems to provide additional benefits.

Within examples, PBN and RNP implementations include limits on allowable variations, and containment boundaries of position of the aircraft 100 as referenced to a flight path centerline that can be tracked using real-time monitoring of the aircraft position and ANP uncertainty based on received navigation signals. RNP is distinct from general RNAV systems in that it requires a real-time measurement of ANP, which is an estimation of a maximum position uncertainty of the aircraft 100.

Generally, ANP has been used only as a trigger value for performance and alerting. Real-time determined ANP that is substantially better than required for the aircraft 100 has not been exploited. While guidelines for and certified budgets for flight paths may be on the order of half the required performance value (e.g., 0.5 nautical mile (NM) for an RNP 1 procedure), navigation systems can often provide a substantially smaller ANP (e.g., 0.04 NM). This difference, or a portion thereof, can be used in real-time to provide purposeful variation in a defined flight path. As ANP changes, the aircraft 100 can adjust allowed variations to ensure flight performance requirements are met.

Figure 2:
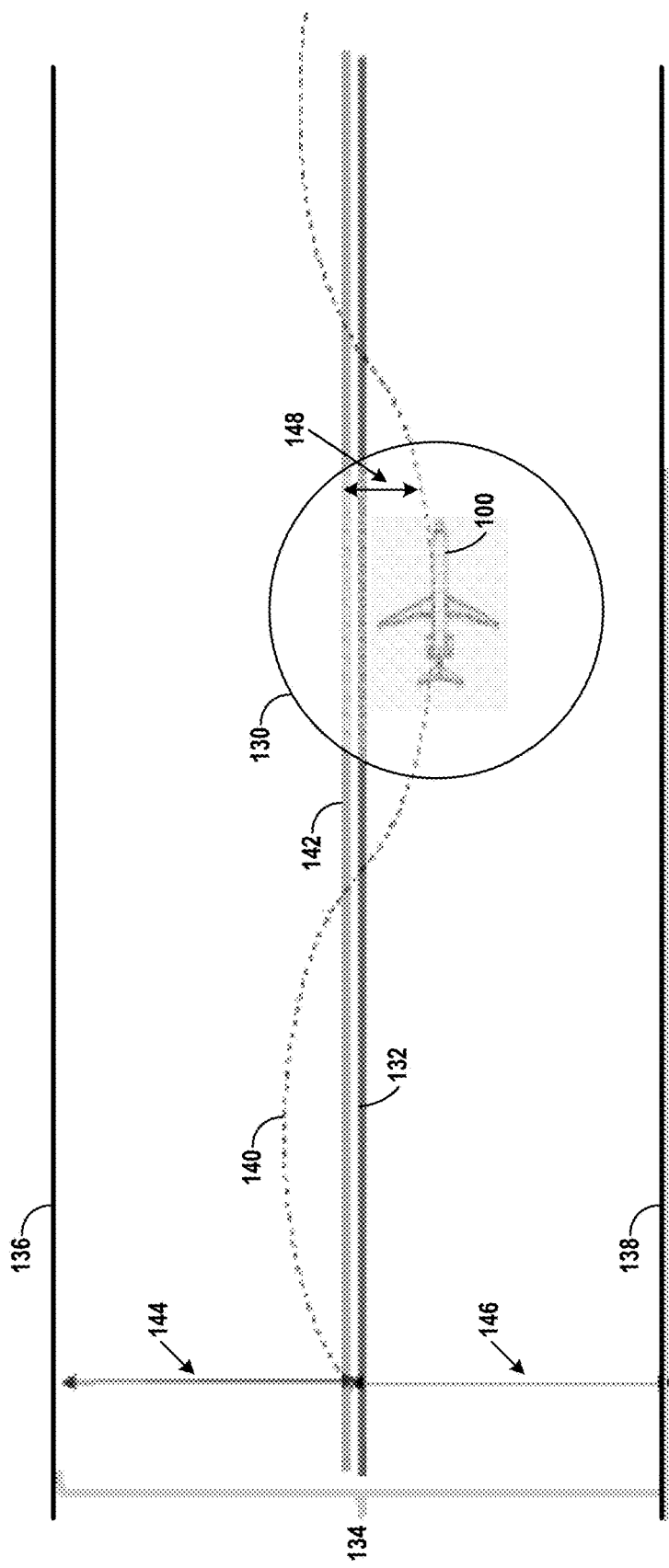
FIG. 2 is a diagram illustrating a flight path for the aircraft and an application of variability introduced from a flight path centerline within defined limits of the RNP procedure, according to an example embodiment.

FIG. 2 is a diagram illustrating a flight path for the aircraft 100 and an application of variability introduced to a flight path centerline. In FIG. 2, an ANP 130 of the aircraft 100 can be determined that indicates uncertainty in real time positioning of the aircraft 100 during flight based on information derived from the navigation system 104 onboard the aircraft 100. The ANP 130 is shown as an area in which the aircraft 100 is located to provide limits on a worst-case true physical position or geographic location of the aircraft 100. The ANP 130 may be determined based on a flight path centerline 142, which is based on a published procedure centerline flight path 132 information from the data storage 126 as well as the aircraft position and speed information available from the navigation system 104.

An RNP instrument flight procedure 134 for the aircraft 100 is shown to indicate a fixed-route accuracy and containment boundaries 136 and 138 required during flight for the aircraft 100 to fly a path between two points along the flight path 132. The containment boundaries 136 and 138 are defined by the published procedure centerline flight path 132 with limits determined by associated margins 144 and 146 on either side of the published procedure centerline flight path 132.

Since a possible location of the aircraft 100, represented by the ANP 130, is determined to be within the containment boundaries 136 and 138 of the RNP instrument flight procedure 134, there is additional spacing available within the margins 144 and 146 for use to add variability to the flight path centerline 142. Thus, the system 102 onboard the aircraft 100 can calculate a new flight path 140 to be flown by the aircraft 100. A modification to the flight path centerline 142 resulting in the new flight path 140 may be based on spacing input 120 received from the ATC that indicates spacing requirements between the aircraft 100 and one or more other aircraft, as well as information 122 relating to communities underneath the flight path centerline 142. The modification can be calculated so that the aircraft 100 remains within the containment boundaries 136 and 138 of the RNP instrument flight procedure 134 while reducing noise impact to the communities underneath the flight path centerline 142 and meeting the spacing requirements of the ATC.

In one example, the margin 144 is a distance away from the flight path centerline 142 along a first direction and the margin 146 is the same distance away from the flight path centerline 142 along a second direction, and a variation 148 can be calculated from the flight path centerline 142 along either direction (e.g., in FIG. 2 along the second direction) so as to be within the distance of the margin 146. Here, the aircraft 100 can then fly along the flight path 140 at the variation 148 from the flight path centerline 142 to introduce variability to the flight path 140. Thus, an alternate flight path can be calculated within the distance of the first margin 144 and the second margin 146 and accounting for the ANP 130.

As shown in FIG. 2, the variation 148 can be determined at different points along the flight path 140 due to changing values of the RNP instrument flight procedure 134 along the flight path centerline 142 and changing values of the ANP 130 during flight. Thus, the aircraft 100 can fly a dynamically varying flight path 140 on a straight procedure flight segment in the presence of varying ANP 130 while remaining with the allowed margins 144 and 146 about the flight path centerline 142.

An amount of the variation 148 can be determined based on a difference between the real time positioning of the aircraft 100 and the margin 146, and this difference can be used to limit the modification to the flight path 140 to be flown by the aircraft 100.

In other examples, the modification to the flight path 140 to be flown by the aircraft 100 can be based on a residual flight margin available for use that is due to the ANP 130, the flight path centerline 142, the RNP instrument flight procedure 134, and the containment boundaries 136 and 138. The calculated flight margin is a distance available on each side of the flight path centerline 142 within the containment boundaries 136 and 138 that is available for use after accounting for the ANP 130. A flight error tolerance may be established based on flight guidelines that enable some default error in flight path. Further, the flight margin can be determined at different points along the flight path 140 due to changing values of the RNP instrument flight procedure 134 along the flight path 140 and changing values of the ANP 130 during flight.

By applying modifications to the flight path 140, the aircraft 100 can be steered, in approximately real time, in response to the information 122 relating to communities underneath the published procedure centerline 134. This may enable noise distribution of aircraft over communities.

Figure 3:
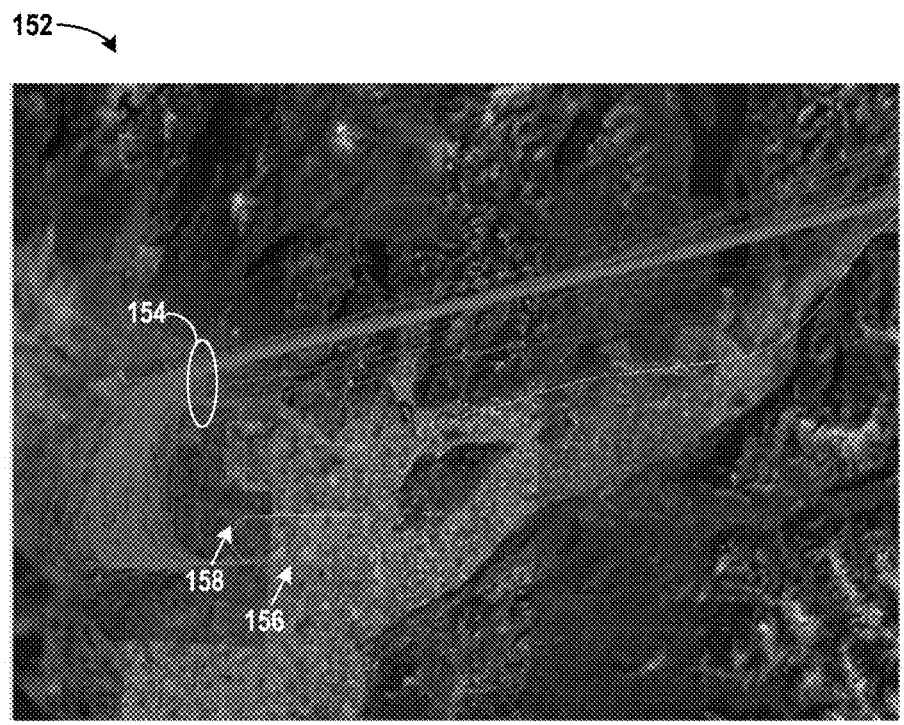
FIG. 3 illustrates an example of concentration of the recorded flight paths for RNP approaches to an airport relative to traditional traffic management, according to an example embodiment.

FIG. 3 illustrates an example an airport vicinity map 152 of recorded flight paths for approaches to an airport 156, from which a noise exposure map can be determined. FIG. 3 illustrates the very high repeatability and precise path following capabilities of RNP approaches 158 compared to a similar number of tracks from conventional traffic management 154, and also illustrates a need for introducing variability into flight paths.

Figure 4:
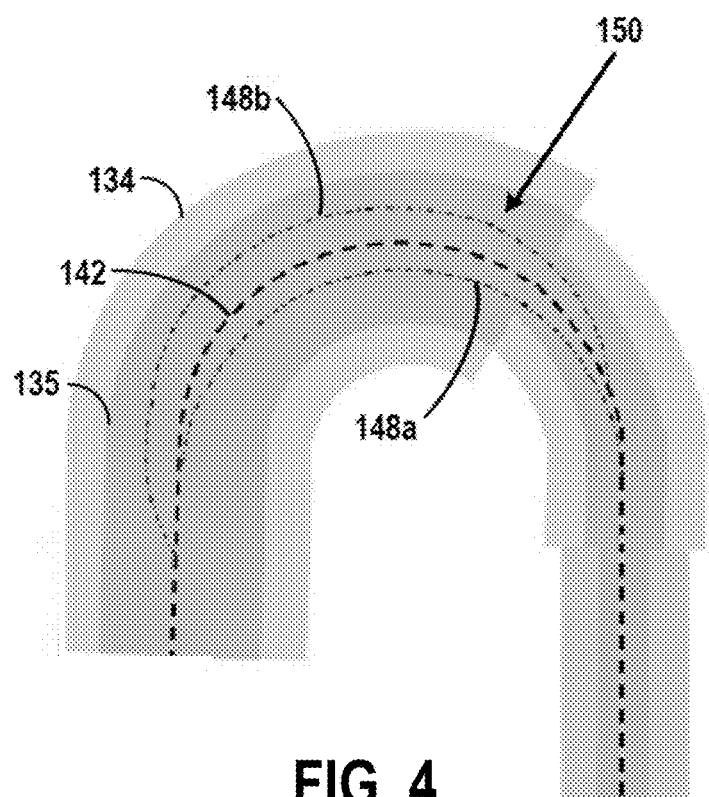
FIG. 4 is a diagram illustrating a flight path for the aircraft and an application of variability introduced to manage path length in a context of a curved RNP approach procedure, according to an example embodiment.

FIG. 4 is a diagram illustrating the flight path centerline 142 and an application of variability introduced in a context of a curved RNP approach procedure. In FIG. 4, variations 148a-b are shown at different points along the flight path but within the RNP procedure 134 boundaries and a boundary in consideration of measured ANP 135. The variation 148a is an example for a path deviation inside of the flight path centerline 142 during the turn, and the variation 148b is an example deviation outside of the flight path centerline 142. An available flight margin 150 is illustrated as the inner shaded area on either side of the flight path centerline 142. FIG. 4 illustrates an example where the designated RNP value in the published procedure centerline 134 changes and the measured ANP 135 remains constant, so the available flight margin 150 in which flight path variation can be applied is commensurably changed.

Figure 5:
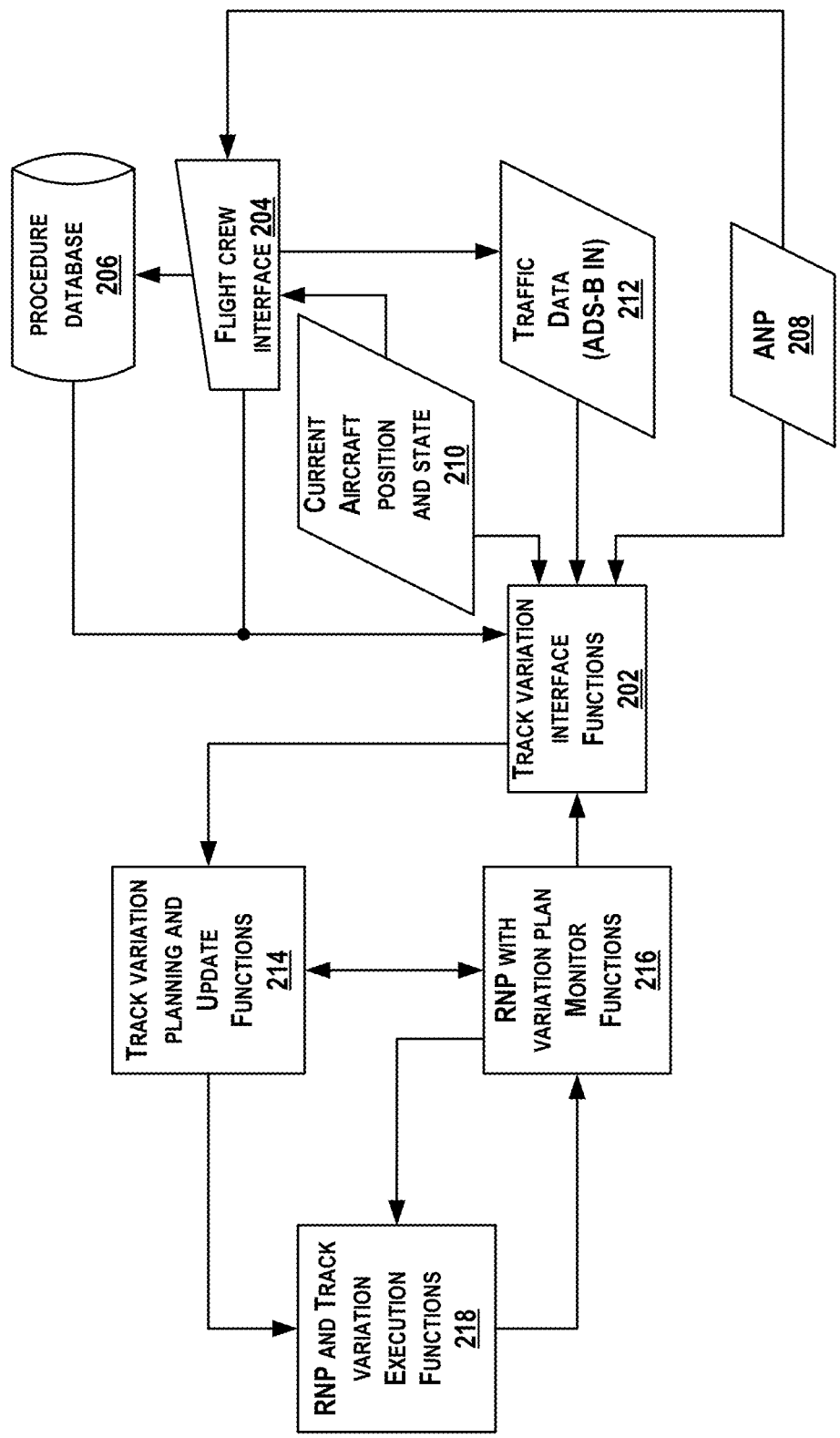
FIG. 5 is a block diagram illustrating example inputs to and functions performed by the aircraft to introduce variability into the flight path, according to an example embodiment.

FIG. 5 is a block diagram illustrating example inputs to and functions performed by the aircraft 100 to generate a variable flight path 140. Track Variation interface functions 202 include interfaces that receive or output information to and from external sources. Example information received may include user input from flight crew interfaces 204, such as implemented on a flight deck device with a control and display unit in the form of a page with selectable actions and parameters and text providing status or option choices. Other example information includes a flight manager or electronic flight bag instrument procedure database 206, which includes instrument procedures available to be flown by the aircraft 100 and all required data for a procedure, such as waypoints and path segments that define centerlines, RNP values etc. Further example information includes an ANP 208 input, current aircraft position and state 210 (including aircraft position and speed information available from the navigation system 104), and traffic data 212. The traffic data 212 includes automatic dependent surveillance-broadcast in (ADS-B IN) data including aircraft identification, position and speed broadcast by an aircraft. An ADS-B traffic processor receives these broadcasts from other nearby aircraft and assembles them into data, a map, or a picture of nearby traffic that can be used by various applications, for example, for aircrew situational awareness, noise spreading, or coordinating variation paths to enhance safety or to increase timing and spacing effects.

Track variation planning and update functions 214 receive information from the RNP interface functions 202, and define scope, objectives and limitations for variation in flight paths, and then also build the variation plan (or path) that will meet the objectives within the defined scope and limitations, including the limitation imposed by the procedure RNP bounds and the navigation performance. In an example where the objectives cannot be met within the limits and scope imposed, the Track Variation planning and update functions 214 can implement a "best effort" variation plan that scales the variation and the objectives to what is achievable or can request new objectives and/or scope from the user.

The track variation planning and update functions 214 thus use the RNP instrument flight procedure performance requirements, measured ANP 208, flight mode information from the user input or from a flight manager function, and the current and trends in previous position and state to determine the flight margin (FM) 150. The flight margin 150 may be a margin within the procedure's defined RNP procedure containment boundaries 136 and 138 that can be used for purposeful variation. The flight margin 150 is determined by the procedure's baseline centerline, the ANP and detected trends in dynamic ANP changes, and the flight technical error (FTE) budget for the current flight mode (e.g., auto flight, flight director or manually flown) based on current and downstream RNP designation. As an example, flight margin (FM)=RNP−ANP−FTE−a dynamically-adjusted buffer. The flight margin 150 is a margin or variation distance available on each side of the procedure baseline centerline, i.e., a flight margin of 0.5 NM means that the variation of 0.5 NM on either side of the centerline is available.

The flight margin 150 may vary at different points along the planned route due to changing RNP values, for example, if the scope of the variable operation spans multiple RNAV/RNP procedures (e.g., an en-route, arrival, and approach procedures) or if a single procedure has different RNP values associated with different segments (e.g., many approach procedures have an RNP of 1 NM outside of the final approach fix (FAF) and 0.3 NM within the FAF). The flight margin 150 may also vary if ANP changes (for example, the number of GNSS satellites within of the navigation system 104 view changes).

The track variation planning and update functions 214 may also take into account general operational constraints and preferences. These may be associated with types of procedures (e.g., approaches), specific procedures (e.g., one of the approach procedures for a specific airport), all procedures, or procedures with certain characteristics (e.g., RNP of 0.5 or less). These constraints and preferences can take general forms (e.g., use only ½ of the available flight margin for variation) or can be specific (e.g., avoid a left 0.5 NM for the last 2 NM of approach procedure x.1).

The track variation planning and update functions 214 may also receive traffic location and velocity inputs from the traffic data ADS-B IN 212, develop traffic tracks over time, and combine data with instrument procedure data from procedure database 206 to build a variation-relevant picture of what nearby traffic is doing. The variation-relevant picture includes information indicating aircraft traffic and associated procedures of the traffic, and offsets or variations from the procedure baseline centerlines for each traffic aircraft.

The track variation planning and update functions 214 determines applicable variations that may consider noise spreading or path spreading for safety enhancements by randomly selecting or specifying applicable variation targets. Some strategies for the variable path generation include fixed distance offsets, fixed margin offsets (e.g. offset related to RNP-ANP), using damped pseudo-random path variation functions, using fixed offset ADS-B stagger (e.g., maximize offset from aircraft(s) in front using other aircraft position feedback) from ADS-B IN, or using fixed margin ADS-B stagger.

The track variation planning and update functions 214 may also determine path stretching or compression for spacing and time-of-arrival control using sinusoidal or S-turn path stretching, constrained vectors path stretching (shallow angle off path, followed by shallow angle return to path, repeat as required), damped pseudo-random path variation, or curved segment shortening or lengthening. The track variation planning and update functions 214 may use ADS-B or other air traffic position data to coordinate the spacing and time-of-arrival path variations with the paths and locations of other aircraft to enhance safety or to reduce noise impacts.

The RNP with variation plan monitor functions 216 review outputs of the Track Variation planning and update functions 214 for changes that may occur due to changing ANP 208 input. The RNP with Variation Plan Monitor Functions 216 further display the performance of the aircraft with the respect to the bounding procedure baseline centerline based RNP boundaries, the current ANP 208, and the currently active variation path from the track variation planning and update functions 214.

Following, RNP path execution functions 218 cause the aircraft 100 to fly the modified flight path within the limits of the RNP procedure. The RNP path execution function 218 could, for example, take advantage of native functions within the flight manager 105 (as in FIG. 1) such as processors 125 and retrieval of executable instructions for RNP monitoring 129.

Figure 6:
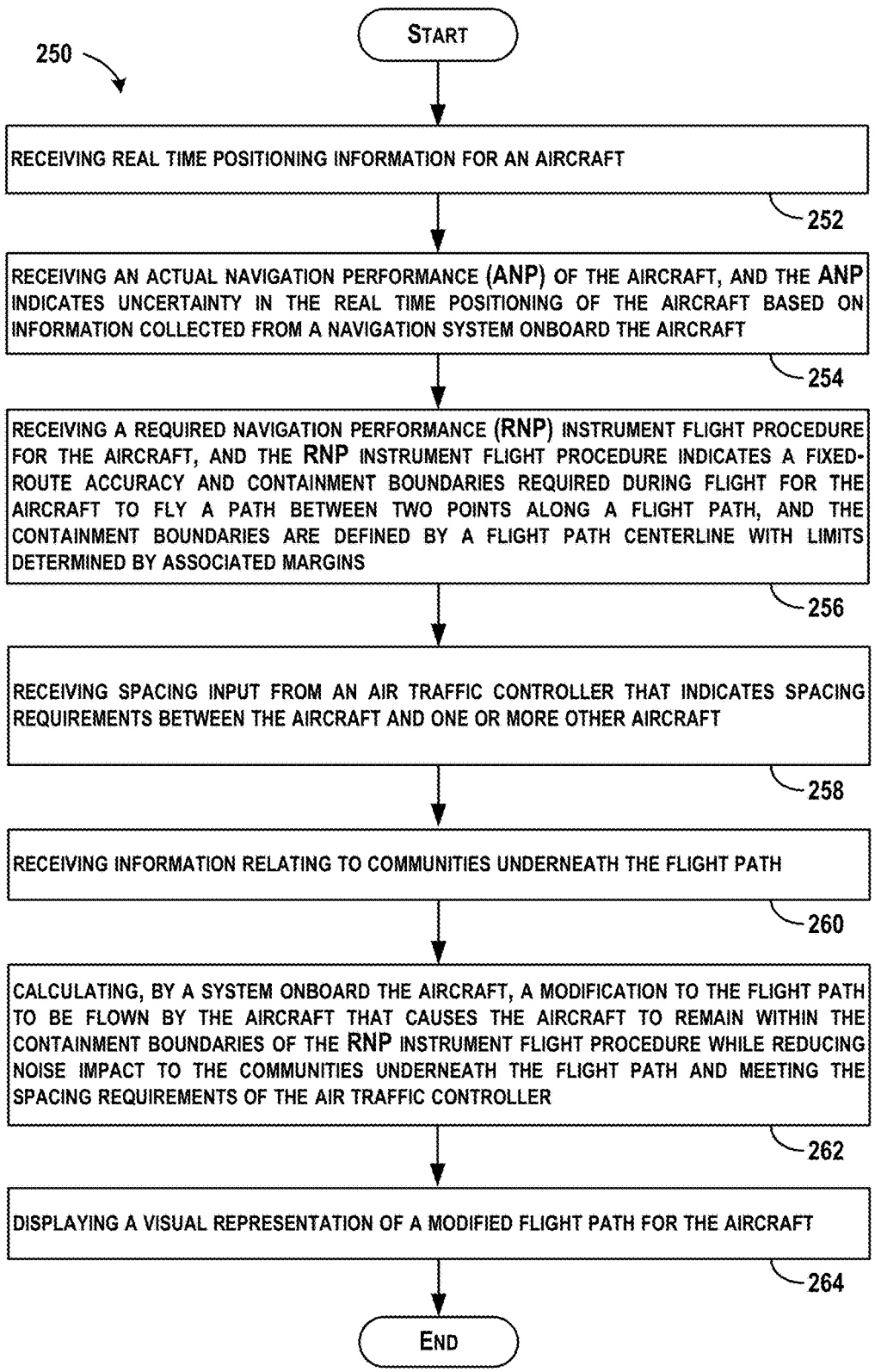
FIG. 6 shows a flowchart of an example method for modifying the flight path of the aircraft, according to an example embodiment.

FIG. 6 shows a flowchart of an example method 250 for modifying the flight path 140 of the aircraft 100, according to an example embodiment. Method 250 shown in FIG. 6 presents an embodiment of a method that could be used with the aircraft 100 shown in FIG. 1, for example, and may be performed by the system 102. Further, devices or systems may be used or configured to perform logical functions presented in FIG. 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 250 may include one or more operations, functions, or actions as illustrated by one or more of blocks 252-264. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 6 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 252, the method 250 includes receiving real time positioning information for the aircraft 100, such as from the navigation system 104.

At block 254, the method 250 includes receiving the ANP of the aircraft 100, and the ANP indicates uncertainty in the real time positioning of the aircraft 100 during flight based on information collected from the navigation system 104 onboard the aircraft 100.

At block 256, the method 250 includes receiving the RNP instrument flight procedure 134 for the aircraft 100, and the RNP instrument flight procedure indicates a fixed-route accuracy and the containment boundaries 136 and 138 required during flight for the aircraft 100 to fly a path between two points along the flight path 132. The containment boundaries 136 and 138 are defined by the flight path centerline 142 with limits determined by the associated margins 144 and 146.

At block 258, the method 250 includes receiving the spacing input 120 from the ATC that indicates spacing requirements between the aircraft 100 and one or more other aircraft.

At block 260, the method 250 includes receiving information 122 relating to communities underneath the published procedure 134. In one example, the method 250 is performed by the system 102 onboard the aircraft 100, and the spacing input 120 from the ATC and the information 122 relating to communities underneath the flight path is received by the aircraft 100 wirelessly communicating with one or more ground systems.

At block 262, the method 250 includes calculating, by the system 102 onboard the aircraft 100, a modification to the flight path 140 to be flown by the aircraft 100 that causes the aircraft 100 to remain within the containment boundaries 136 and 138 of the RNP instrument flight procedure 134 while reducing noise impact to the communities underneath the published procedure 134 and meeting the spacing requirements of the ATC.

The associated margins 144 and 146 include a first margin a distance away from the flight path centerline 142 along a first direction and a second margin the distance away from the flight path centerline 142 along a second direction, and the variation 148 from the flight path centerline 142 can be calculated along the first direction within the distance of the first margin. In another example, a difference between the real time positioning of the aircraft 100 and the first margin can be determined and used to limit the modification to the flight path to be flown by the aircraft 100. In other examples, the modification to the flight path to be flown by the aircraft 100 can be determined as a random modification, and the modification adds variability to the flight path to distribute noise over the communities underneath the flight path. In still other examples, the flight margin 150 available for use can be determined based on the ANP 130, the flight path centerline 142, the RNP instrument flight procedure 134, and a flight error tolerance.

In still further examples, the information indicating position or variations from flight path centerlines for other aircraft can be received, and the modification to the flight path can be determined based on the variations from flight path centerlines of published RNP procedures for the other aircraft so as to meet the spacing requirements of the ATC, or so as to reduce community noise impacts.

At block 264, the method 250 includes displaying a visual representation of a modified flight path for the aircraft 100. For example, the visual representation can be provided on the display 114.

FIG. 7 shows a flowchart of an example method for use with the method 250, according to an example embodiment. At block 266, functions include determining the flight margin at different points along the flight path due to changing values of the RNP along the flight path and changing values of the ANP during flight.

FIG. 8 shows a flowchart of an example method for use with the method 250, according to an example embodiment. At block 268, functions include determining the modified flight path for the aircraft so as to steer the aircraft, in approximately real time, in response to the information relating to communities that can include real time community noise inquiries.

FIG. 9 shows a flowchart of an example method for use with the method 250, according to an example embodiment. At block 270, functions include displaying a visual representation of flight paths taken by a plurality of aircraft, variation margins that can be achieved within RNPs for the plurality of aircraft, and a noise exposure map for the communities underneath the RNPs. Such information may be displayed on the display 114. The visual representation may further show flight paths taken by the aircraft as well as variation margins that can be achieved within procedure RNP containment boundaries for such aircraft.

FIG. 10 shows a flowchart of an example method for use with the method 250, according to an example embodiment. At block 272, functions include displaying a visual representation of the containment boundaries 136 and 138 of the RNP instrument flight procedure 134. The visual representation in this example may further include the variation path centerline, the ANP, and the current position of the aircraft, for example.

FIG. 11 shows a flowchart of an example method for use with the method 250, according to an example embodiment. At block 274, functions include causing the aircraft 100 to fly the modified flight path.

Example systems and methods described enable many benefits including noise spreading, localized (and potentially dynamic) noise avoidance, and path stretching or compression for longitudinal spacing adjustments (ground requested or aircrew initiated). Further, safety enhancements can be realized using path variation randomization to further decrease a probability that inadvertently co-path flights are on the same path.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for modifying a flight path of an aircraft, comprising:

receiving real time positioning information for an aircraft;

receiving an actual navigation performance (ANP) of the aircraft, wherein the ANP indicates uncertainty in the real time positioning of the aircraft based on information collected from a navigation system onboard the aircraft;

receiving a required navigation performance (RNP) instrument flight procedure for the aircraft, wherein the RNP instrument flight procedure indicates a fixed-route accuracy and containment boundaries required during flight for the aircraft to fly a path between two points along a flight path, and wherein the containment boundaries are defined by a flight path centerline with limits determined by associated margins;

receiving spacing input from an air traffic controller that indicates spacing requirements between the aircraft and one or more other aircraft;

receiving information relating to communities underneath the flight path;

calculating, by a system onboard the aircraft that comprises one or more processors and data storage storing instructions executable by the one or more processors to perform the calculating, a modification to the flight path to be flown by the aircraft that causes the aircraft to remain within the containment boundaries of the RNP instrument flight procedure while reducing noise impact to the communities underneath the flight path and meeting the spacing requirements of the air traffic controller using the real time positioning information and the ANP of the aircraft; and displaying a visual representation of a modified flight path for the aircraft.

2. The method of claim 1, wherein the method is performed by the system onboard the aircraft, and wherein:

receiving the spacing input from the air traffic controller and receiving the information relating to communities underneath the flight path comprises the system onboard the aircraft wirelessly communicating with one or more ground systems.

3. The method of claim 1, wherein the associated margins include a first margin a distance away from the flight path centerline along a first direction and a second margin the distance away from the flight path centerline along a second direction, and wherein calculating, by the system onboard the aircraft, the modification to the flight path to be flown by the aircraft that causes the aircraft to remain within the containment boundaries comprises:

calculating an alternate flight path within the distance of the first margin and the second margin.

4. The method of claim 1, wherein the associated margins include a first margin a distance away from the flight path centerline along a first direction and a second margin the distance away from the flight path centerline along a second direction, and wherein calculating, by the system onboard the aircraft, the modification to the flight path to be flown by the aircraft that causes the aircraft to remain within the containment boundaries comprises:

determining a difference between the real time positioning of the aircraft and the first margin; and using the difference to limit the modification to the flight path to be flown by the aircraft.

5. The method of claim 1, wherein calculating, by the system onboard the aircraft, the modification to the flight path to be flown by the aircraft that causes the aircraft to remain within the containment boundaries comprises:

determining a random modification to the flight path to be flown by the aircraft with the aircraft still remaining within the containment boundaries.

6. The method of claim 1, wherein calculating, by the system onboard the aircraft, the modification to the flight path to be flown by the aircraft that causes the aircraft to remain within the containment boundaries comprises:

adding variability to the flight path to distribute noise over the communities underneath the flight path.

7. The method of claim 1, wherein calculating, by the system onboard the aircraft, the modification to the flight path to be flown by the aircraft comprises:

determining a flight margin available for use based on the ANP, the flight path centerline, the RNP instrument flight procedure, and the containment boundaries, wherein the flight margin is a distance available on each side of the flight path centerline that is available for use.

8. The method of claim 7, further comprising:

determining the flight margin at different points along the flight path due to changing values of the RNP instrument flight procedure along the flight path and changing values of the ANP during flight.

9. The method of claim 1, wherein the information relating to communities comprises real time community noise inquiries, and the method further comprises:

determining the modified flight path for the aircraft so as to steer the aircraft, in approximately real time, in response to the information.

10. The method of claim 1, further comprising:

displaying a visual representation of flight paths taken by a plurality of aircraft, variation margins that can be achieved within RNPs for the plurality of aircraft, and a noise exposure map for the communities underneath the RNPs.

11. The method of claim 1, further comprising displaying a visual representation of the containment boundaries of the RNP instrument flight procedure.

12. The method of claim 1, wherein calculating, by the system onboard the aircraft, the modification to the flight path that causes the aircraft to remain within the containment boundaries comprises:

receiving information indicating position or variations from flight path centerlines for the one or more other aircraft; and determining the modification to the flight path based on the variations from flight path centerlines of published RNP procedures for the one or more other aircraft so as to meet the spacing requirements of the air traffic controller.

13. The method of claim 1, wherein calculating, by the system onboard the aircraft, the modification to the flight path that causes the aircraft to remain within the containment boundaries comprises:

receiving information indicating position or variations from flight path centerlines for the one or more other aircraft; and determining the modification to the flight path based on the variations from flight path centerlines of published RNP procedures for the one or more other aircraft so as to reduce community noise impacts.

14. The method of claim 1, further comprising:

causing the aircraft to fly the modified flight path.

15. A system comprising:

a communication interface for receiving real time positioning of an aircraft during flight, and an actual navigation performance (ANP) of the aircraft, wherein the ANP indicates uncertainty in the real time positioning of the aircraft, and the communication interface for receiving information for a required navigation performance (RNP) instrument flight procedure for the aircraft, wherein the RNP instrument flight procedure indicates a fixed-route accuracy and containment boundaries required during flight for the aircraft to fly a path between two points along a flight path, and wherein the containment boundaries are defined by a flight path centerline with limits determined by associated margins;

data storage for storing spacing input from an air traffic controller that indicates spacing requirements between the aircraft and one or more other aircraft, and information relating to communities underneath the flight path;

one or more processors for executing instructions stored on the data storage to calculate a modification to the flight path to be flown by the aircraft that causes the aircraft to remain within the containment boundaries of the RNP instrument flight procedure while reducing noise impact to the communities underneath the flight path and meeting the spacing requirements of the air traffic controller using the real time positioning information and the ANP of the aircraft; and a display for displaying a visual representation of a modified flight path for the aircraft.

16. The system of claim 15, wherein the associated margins include a first margin a distance away from the flight path centerline along a first direction and a second margin the distance away from the flight path centerline along a second direction, and wherein the one or more processors further:
  determine a difference between the real time positioning of the aircraft and the first margin; and
  use the difference to limit the modification to the flight path to be flown by the aircraft.

17. The system of claim 15, wherein the one or more processors further determine a flight margin available for use based on the ANP, the flight path centerline, the RNP instrument flight procedure, and the containment boundaries, wherein the flight margin is a distance available on each side of the flight path centerline that is available for use.

18. The system of claim 15, wherein the information relating to communities comprises real time community noise inquiries, and wherein the one or more processors further determine the modified flight path for the aircraft so as to steer the aircraft, in approximately real time, in response to the information.

19. A non-transitory computer readable storage medium having stored therein instructions, that when executed by a system having one or more processors, causes the system to perform functions comprising:
  receiving real time positioning information of an aircraft;
  receiving an actual navigation performance (ANP) of the aircraft, wherein the ANP indicates uncertainty in the real time positioning of the aircraft based on information collected from a navigation system onboard the aircraft;
  receiving a required navigation performance (RNP) instrument flight procedure, wherein the RNP instrument flight procedure indicates a fixed-route accuracy and containment boundaries required during flight for the aircraft to fly a path between two points along a flight path, and wherein the containment boundaries are defined by a flight path centerline with limits determined by associated margins;
  receiving spacing input from an air traffic controller that indicates spacing requirements between the aircraft and one or more other aircraft;
  receiving information relating to communities underneath the flight path;
  calculating a modification to the flight path to be flown by the aircraft that causes the aircraft to remain within the containment boundaries of the RNP instrument flight procedure while reducing noise impact to the communities underneath the flight path and meeting the spacing requirements of the air traffic controller using the real time positioning information and the ANP of the aircraft; and
  displaying a visual representation of a modified flight path for the aircraft.

20. The non-transitory computer readable storage medium of claim 19, wherein the function of calculating the modification to the flight path to be flown by the aircraft comprises:
  determining a flight margin available for use based on the ANP, the flight path centerline, the RNP instrument flight procedure, and the containment boundaries, wherein the flight margin is a distance available on each side of the flight path centerline that is available for use.

* * * * *